United States Patent [19]

Kazumi

[11] 4,411,508
[45] Oct. 25, 1983

[54] ANNUNCIATOR FOR A FOCUS ADJUSTING DEVICE

[75] Inventor: Jiro Kazumi, Kawasaki, Japan

[73] Assignee: Canon Kabushiki Kaisha, Tokyo, Japan

[21] Appl. No.: 291,091

[22] Filed: Aug. 7, 1981

[30] Foreign Application Priority Data

Aug. 19, 1980 [JP] Japan .................... 55-114198

[51] Int. Cl.³ .................................... G03B 13/02
[52] U.S. Cl. .................... 354/198; 354/289
[58] Field of Search .................... 354/195, 198, 289

[56] References Cited

U.S. PATENT DOCUMENTS 4,272,176  6/1981  Maitani et al. .................... 354/289
4,319,813  3/1982  Aoki et al. .................... 354/198

FOREIGN PATENT DOCUMENTS 55-155337  12/1980  Japan .................... 354/289

*Primary Examiner*—Russell E. Adams
*Attorney, Agent, or Firm*—Toren, McGeady and Stanger

[57] ABSTRACT

A focus adjusting device is a type of an autofocusing device having a servomechanism which drives the lens of a camera to bring it into focus. The focus adjusting device is provided with an annunciator for informing an operator of the state of focus of the camera lens. The annunciator is actuated after confirming the finish of the distance measuring operation of the device and the stop of the lens in the focused position.

4 Claims, 3 Drawing Figures

ANNUNCIATOR FOR A FOCUS ADJUSTING DEVICE

BACKGROUND OF THE INVENTION

1. Field of the Invention

The present invention relates to an annunciator to display the operating state of the automatic focus adjusting device for a camera.

2. Description of the Prior Art:

An automatic focus adjusting device for automatically focusing the optics of a camera on the object to be photographed. Various annunciator types have been proposed for displaying that the automatic focus adjusting operation has been finished and the optics is in a focus state.

In the conventional automatic focus adjusting device, particularly of the type when the lens is driven by a servomechanism so as to be brought in an in-focus state, there exists such a shortcoming. The lens does not stop at the in-focus position but goes beyond and returns to the focused position. In one type the in-focus state is initially displayed when the in-focus state is obtained and continues to be displayed even during the motion of the lens after that, while in other types the in-focus state is displayed every time the lens assumes the in-focus position. The display is repeated many times until the lens finally stops at the in-focus position, which is a troublesome mode of operation.

SUMMARY OF THE INVENTION

It is an object of the invention to provide an annunciator for an automatic focus adjusting device free from the above-mentioned shortcomings of the conventional annunciator, whereby a sufficient display is obtained for the focus adjustment confirmation, with no deceptive displays.

It is another object of the invention to provide an annunciator for a focus adjusting device wherein the annunciator is adapted to be actuated after confirming the finish of the distance measuring operation of the device and the stop of the lens in the in-focus position.

These and further objects and features of the invention will become apparent from the following detailed description of embodiments thereof taken in connection with the accompanying drawings.

DESCRIPTION OF THE PREFERRED EMBODIMENTS

The present invention will be explained in detail according to the accompanying drawings of the embodiment thereof.

Figure 1:
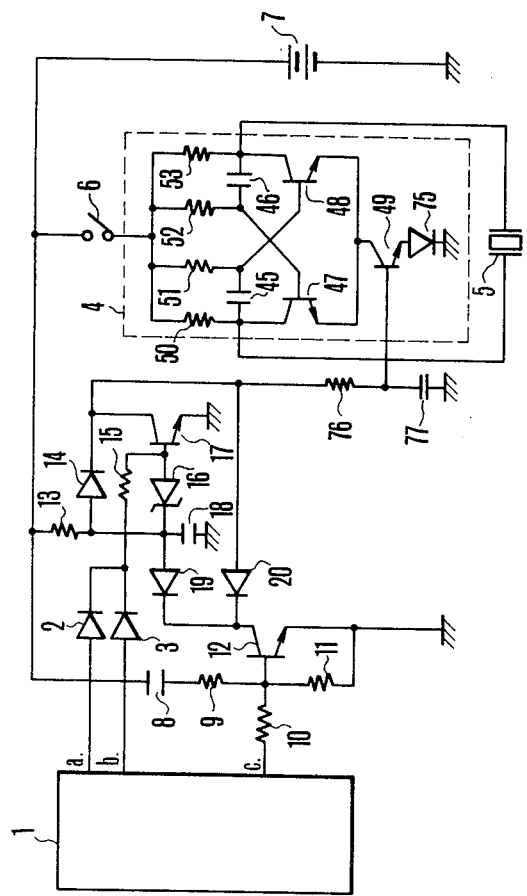
FIG. 1 shows the circuit diagram of an embodiment of an annunciator for an automatic focus adjusting device according to the invention.

FIG. 1 shows the circuit diagram of an embodiment of the annunciator for the automatic focus adjusting device according to the invention. In the drawing, 1 is the automatic focus adjusting device, whereby the outputs a and b are of L level when the lens is in the in-focus state, while either a or b is of H level when the lens is in the out-of-focus state. The output c is of H level while the distance measuring operation is being carried out. The automatic focus adjusting device 1 will be explained later according to FIG. 2. The outputs a, b and c are delivered to the switching circuit, consisting of transistors 17, 12, diodes 2, 3, 14, 19 and 20, Zener diode 16, condensers 8, 18 and so on, while the output of the switching circuit is connected to the astatic multivibrator 4 through a LP (low-pass) filter, consisting of the resistance 76 and the condenser 77. Further, a power source identified by the numeral 7 and a switch 6 allow the operator to select "Display on" or "Display off". The switch 6 can be opened when the display disturbs other photographing operations. An acoustic element is identified by the numeral 5.

The operation of the circuit shown in FIG. 1 is as follows. When the automatic focus adjusting device 1 operates while the switch 6 is being closed, the output c is of H (high) level until the distance measuring operation has been finished. Then the transistor 12 is brought into the switched-on state, while the transistor 49 of the astatic multivibrator 4 is brought into the switched-off state, so that the circuit 4 does not operate. If the lens is in the out-of-focus state when the distance measuring operation has been finished and the level of the output becomes L, either output a or b of the circuit 1 is at the H level. In this way the transistor 17 is put in the switched-on state and the level of the input of the transistor 49 becomes L (low) so that the astatic multivibrator 4 does not operate. When the circuit 1 assumes the in-focus state, the level of the outputs a and b of the circuit 1 becomes L so that the transistor 17 is brought into the switched-off state. Because at this time the output c of the circuit 1 is on the L level, the condenser 18 is charged through the resistance 13, while at the same time the condenser 17 is charged through the resistance 76. When the voltage of the condenser 77 becomes higher than the sum of the base-emitter voltage $V_{BE}$ of the transistor 49 of the circuit 4 and the forward voltage $V_F$ of the diode 75, the transistor 49 is switched-on to actuate the astatic multivibrator 4, by means of whose output the acoustic element 5 is excited to acoustically annunciate the in-focus state. Along with the charge of the condenser 18, the terminal voltage $V_C$ thereof becomes higher than the sum of the voltage $V_Z$ of the Zener diode 16 and the base-emitter voltage $V_{BE}$ of the transistor 17. The transistor 17 is switched-on to put the transistor 49 in the switched-off state, whereby the astatic multivibrator 4 stops oscillating so that the acoustic element 5 stops operation. In the embodiment shown in FIG. 1, the acoustic element 5 operates so as to acoustically annunciate the in-focus state for a certain determined time after the focus adjusting operation has been finished.

Further, when the lens is driven by means of the servomechanism of the automatic focus adjusting device moves somewhat to and fro near the in-focus position, the transistor 17 is placed in the switched-off state when the in-focus state is obtained the first time. No display is obtained until the condenser 77 has been charged. When the in-focus state is terminated before the condenser 77 has been charged fully, the focus determining means detects it and send a signal to the lens driving means so as to put the transistor 17 in the switched-on state, so that there will be no display. Consequently, when the time from the start of the charge of the condenser 77 till the transistor 49 has been put into the switched-on state is set longer than that during the first in-focus time in case the in-focus state is over, it is possible that any display cannot be carried out before the in-focus state has been stabilized even when the in-focus state is over.

Figure 2:
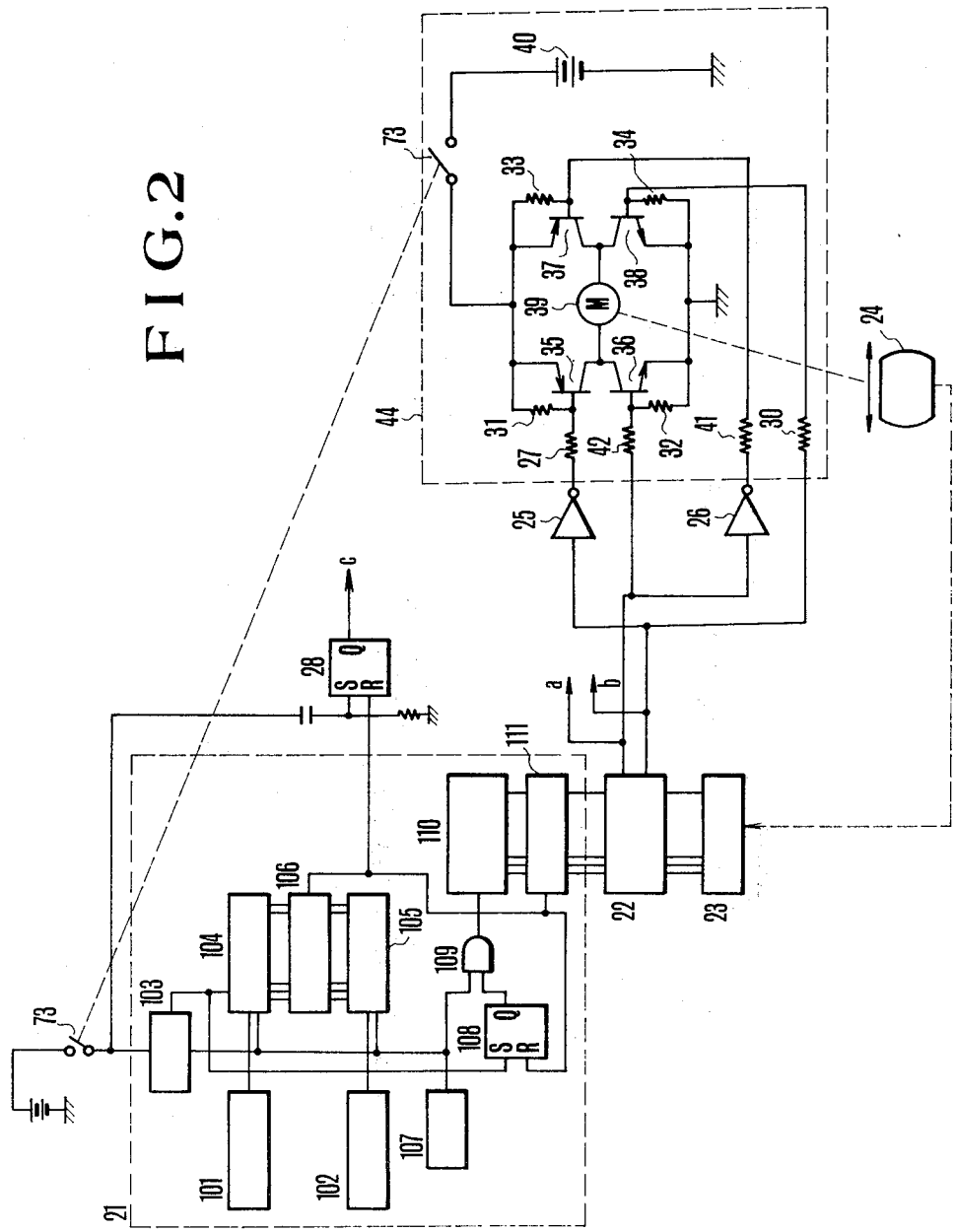
FIG. 2 shows the circuit diagram of an example of the automatic focus adjusting device shown in FIG. 1.

FIG. 2 shows the circuit diagram of an example of the automatic focus adjusting device shown as a block 1 in FIG. 1. The apparatus includes a distance detecting circuit 21, whose details are disclosed in U.S. Pat. No. 4,189,232 (filed Jan. 5, 1978, granted to Asano et al. for an invention entitled "Range Detecting Method and Apparatus" assigned to Canon Kabushiki Kaisha). Accordingly, only the outline thereof is explained here.

101 is a photo sensor array, while 102 is another photo sensor array having the same form as that of array 101 but having more photo sensors than those of 101. The image of the same object is formed on the respective photo sensor arrays 101, 102 by means of an image forming optics (not shown in the drawing) in such a manner that the relative positions of the images vary according to the distance to the object. In order to detect the different positions of the images the output of the sensor array 101 is memorized in the register 104, while the output of the sensor array 102 is successively shifted by one bit in the register 105 by means of the clock pulses from the clock pulse producing circuit 107. The contents in the registers 104 and 105 are compared at each shift by means of the coincidence detecting circuit 106 in such a manner that the number of the clock pulses spent for the shifts, from the start of the shift of the output of the photo sensor array 102, till the contents of the two registers coincide with each other is counted. The count value is considered as the difference amount, namely the distance to the object. The register control circuit 103 is for carrying out the above operation, while 108 is a flip-flop, whose output remains on the H level from the start of the shift of the output of the photo sensor array 102 till the coincidence detecting circuit 106 has detected the coincidence of the contents in the two registers. An AND gate 109 is provided for obtaining the logic product of the output of the above-mentioned flip-flop 108 with the clock pulses, while register 111 is provided for memorizing the content (namely the information of the distance to the object) of the counter 110 when the coincidence detecting circuit 106 has detected the coincidence of the contents of the two registers 104, 105.

24 is the photographing lens, whose forward movement is converted into a digital amount by means of an A/D converter 23. A magnitude comparator 22 is provided for comparing the two digital amounts with each other in such a manner that when one of the two digital amounts is larger than the other, the ouptut terminal a is on H level, while the output terminal b is on L level and when one is larger than the other the output terminal a is on L level, while the output b is on H level. When the two digital amounts are equal, the output terminals a and b are at an L level.

The output (distance information) of the above-mentioned register 111 is compared with the output (advance amount information of the lens) of the converter by means of the magnitude comparator 22, the outputs of whose terminals a and b are delivered to the lens driving circuit 44 through the inverters 25 and 26. The driving circuit is disclosed, for example, in the West German Laid-Open Publication 2842348 (Apr. 12, 1979), so that the circuit is not explained in detail.

A flip-flop 28 is set when the power source for the circuit 21 is closed and reset with the output signal of the coincidence detecting circuit 106 upon completion of distance measurement. The output of the flip-flop 28 is the signal c for the distance measurement operation. Furthermore, the two outputs of the comparator 22 are respectively the signal a for the in-focus state and b for the out-of-focus state in FIG. 1.

Since the distance detecting device 21 started to operate along with the closure of the switch 73 till the distance measurement has been carried out to deliver an output to the register 111, the flip-flop 28 remains set, whereby the output c is at the H level. When the value of the register 111 is larger than the output of the converter 23, a of the output of 22 is at the H level to operate the lens driving circuit 44 in the direction along which the output of the converter increases. When the value of the register 111 is smaller than the output of the converter 23, b of the outputs of 22 is at the H level. When the value of the register 111 is equal to the output of the converter 23, the outputs a and b of 22 are at the L level, which is the in-focus state. The signals a, b and c, obtained through the above-mentioned operation, are delivered to the circuit shown in FIG. 1, and the in-focus state is annunciated after the aforementioned operations. In the case, for example, of a single lens reflex camera, in which the lens driving circuit is provided at the side of the interchangeable lens, the position information is delivered from the driving circuit at a side of the lens to the camera body through the contact provided at the mount to be converted into a digital signal by means of an A/D converter at the side of the camera body.

Figure 3:
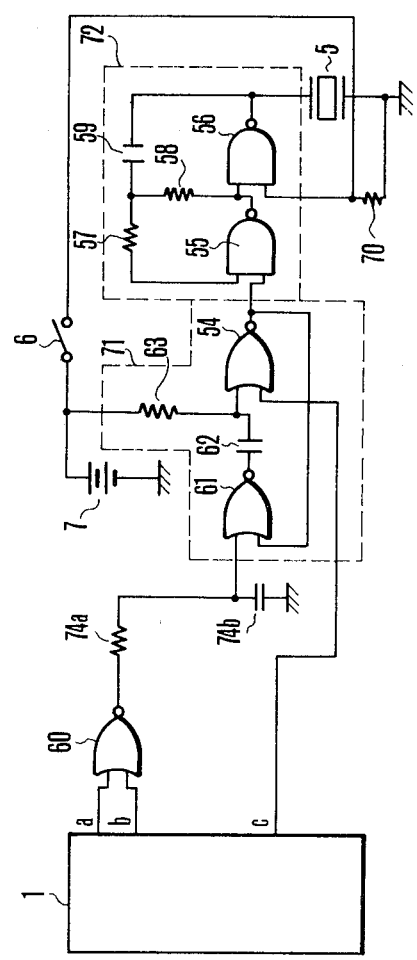
FIG. 3 shows the circuit diagram of another embodiment of the annunciator for the automatic focus adjusting device according to the invention.

FIG. 3 shows the circuit diagram of another embodiment of the annunciation circuit of the invention. In the circuit shown in the drawing the signals a and b from the automatic focus adjusting device 1 are at the L level in the in-focus state, the output of the NOR gate 60 is at the H level and delivered to a circuit consisting of the resistance 74a and the condenser 74b and then to the monostable multivibrator 71, after the stabilized in-focus state has been detected. In this manner the output of the circuit 71 remains at the H level for a determined time, during which the astatic multivibrator 72 oscillates to excite the acoustic element 5. As long as the c output of the circuit 1 is at the H level (in the distance measuring operation), the output of the monostable multivibrator 71 is always at the L level, so that the astatic multivibrator 72 does not oscillate, and thus no annunciation occurs.

In the above embodiment the in-focus state is annunciated only after the stabilized in-focus state has been established along with the operation of the automatic focus adjusting device, so that premature operation due to annunciation during the distance measurement can be avoided. Further, in case the annunciation is made only for a certain predetermined time, the disturbance of photographing operations such as framing, object confirmation, etc. due to this annunciation can be avoided, which is remarkably convenient.

The present invention contemplates visual, acoustic and other constructions.

What is claimed is:

1. An annunciator for a focus adjusting device for informing an operator of the in-focus state of lens means, said focus adjusting device comprising:

focus detecting means for detecting the focusing condition of the lens means with respect to an object and for producing an output indicative of a focus condition;

a servomechanism for driving said lens means in response to the output of said focus detecting means to bring it into focus;

control means responsive to the output of said focus detecting means for actuating said annunciator when said lens means is in the in-focus state, said control means including filter means for eliminating a fluctuation of the output of said focus detecting means produced by the movement of said lens means relative to the object in the vicinity of the in-focus position, whereby a fluctuation of the annunciation of said annunciator is suppressed.

2. An annunciator for a focus adjusting device according to claim 1, wherein the focus adjusting operation finish annunciation is automatically stopped after the lapse of a certain predetermined time after the start of the annunciation.

3. An annunciator for a focus adjusting device according to claim 1, wherein a switch means for prohibiting the annunciation by the annunciator is provided.

4. An annunciator for a focus adjusting device according to claim 1, wherein lens driving means is provided at the side of the interchangeable lens of the camera.

* * * * *